US012563078B2

(12) United States Patent (10) Patent No.: US 12,563,078 B2

Sinha et al. (45) Date of Patent: Feb. 24, 2026

(54) APP SECURITY: AGENTLESS SOLUTION TO IDENTIFY INTERNAL SERVICE TO SERVICE DEPENDENCIES AND ROUTES

(71) Applicant: Palo Alto Networks, Inc., Santa Clara, CA (US)

(72) Inventors: Praveen Kumar Sinha, San Jose, CA (US); Venkata Ramadurga Prasad Katakam, Sunnyvale, CA (US); Sri Kumar Chari, Cupertino, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 271 days.

(21) Appl. No.: 18/111,173

(22) Filed: Feb. 17, 2023

(65) Prior Publication Data

US 2024/0283809 A1 Aug. 22, 2024

(51) Int. Cl.
| | |
|---|---|
| *H04L 9/40* | (2022.01) |
| *H04L 41/0681* | (2022.01) |
| *H04L 61/4511* | (2022.01) |
| *H04L 61/4541* | (2022.01) |

(52) U.S. Cl.
CPC ...... H04L 63/1433 (2013.01); H04L 41/0681 (2013.01); H04L 61/4511 (2022.05); H04L 61/4541 (2022.05); H04L 63/1425 (2013.01)

(58) Field of Classification Search
CPC ............. H04L 63/1433; H04L 41/0681; H04L 61/4511; H04L 61/4541; H04L 63/1425; H04L 41/5058
See application file for complete search history.

(56) References Cited

U.S. PATENT DOCUMENTS

| | | | | |
|---|---|---|---|---|
| 10,237,283 | B2 * | 3/2019 | Zhang | H04L 63/1416 |
| 11,080,157 | B1 * | 8/2021 | Roberts | G06F 11/3668 |
| 12,137,108 | B2 * | 11/2024 | Sinha | G06F 11/3476 |
| 12,206,690 | B2 * | 1/2025 | Konda | H04L 63/029 |
| 2016/0371134 | A1 * | 12/2016 | Raghavendra | G06F 11/079 |
| 2018/0152468 | A1 * | 5/2018 | Nor | H04L 63/1425 |
| 2018/0176232 | A1 * | 6/2018 | Rodriguez | H04L 61/4511 |
| 2020/0137094 | A1 * | 4/2020 | Janakiraman | G06N 20/00 |
| 2023/0095870 | A1 * | 3/2023 | Du | H04L 63/1416 |
| | | | | 726/23 |
| 2023/0179623 | A1 * | 6/2023 | Moolchandani | H04L 63/1433 |
| | | | | 726/23 |
| 2023/0370491 | A1 * | 11/2023 | Crabtree | G06N 3/098 |
| 2024/0146755 | A1 * | 5/2024 | Ungureanu | H04L 41/12 |

OTHER PUBLICATIONS

Bionic. Secure Cloud-Native Applications in Production. (c) 2020.

* cited by examiner

*Primary Examiner* — James R Turchen

(74) *Attorney, Agent, or Firm* — Van Pelt, Yi & James LLP

(57) ABSTRACT

The present application discloses a method, system, and computer system for performing discovery of service to service communication traffic. The method includes (i) determining, based at least in part on one or more Domain Name System (DNS) logs, a source Internet Protocol (IP) address based on a resolved record for a requested service, (ii) determining a source service based at least in part on performing a lookup in a service registry based at least in part on the source IP address, and (iii) generating, based at least in part on the source service associated with the source IP, a network graph for an application service comprising the source service and the requested service.

22 Claims, 8 Drawing Sheets

400

Start

Determine that source IP address is to be determined — 505

Capture a DNS log snapshot — 510

Select record in DNS log snapshot — 515

Determine requested service based on the selected DNS log record — 520

Determine, based on the selected DNS log record, source IP address of source service that called the requested service — 525

More records in DNS log snapshot? — 530

Yes

No

Done? — 535

No

Yes

End

500

600

APP SECURITY: AGENTLESS SOLUTION TO IDENTIFY INTERNAL SERVICE TO SERVICE DEPENDENCIES AND ROUTES

BACKGROUND OF THE INVENTION

Development of application services has evolved from monolithic services to a collection of microservices that are generally deployed on a public cloud service. The collection of microservices to provide an application service are generally large. As the more microservices are added to the application service, the complexity of the connectivity among microservices is significantly increased. For example, no microservice is an isolation and each microservice has downstream dependencies. Accordingly, as microservices are added to the application service, the degrees of connectivity exponentially increase thereby making various application service functions difficult. Examples of functions that are difficult to perform against an application service comprising many microservices are security, tracing, instrumentation, and debugging.

BRIEF DESCRIPTION OF THE DRAWINGS

Various embodiments of the invention are disclosed in the following detailed description and the accompanying drawings.

DETAILED DESCRIPTION

Figure 1:
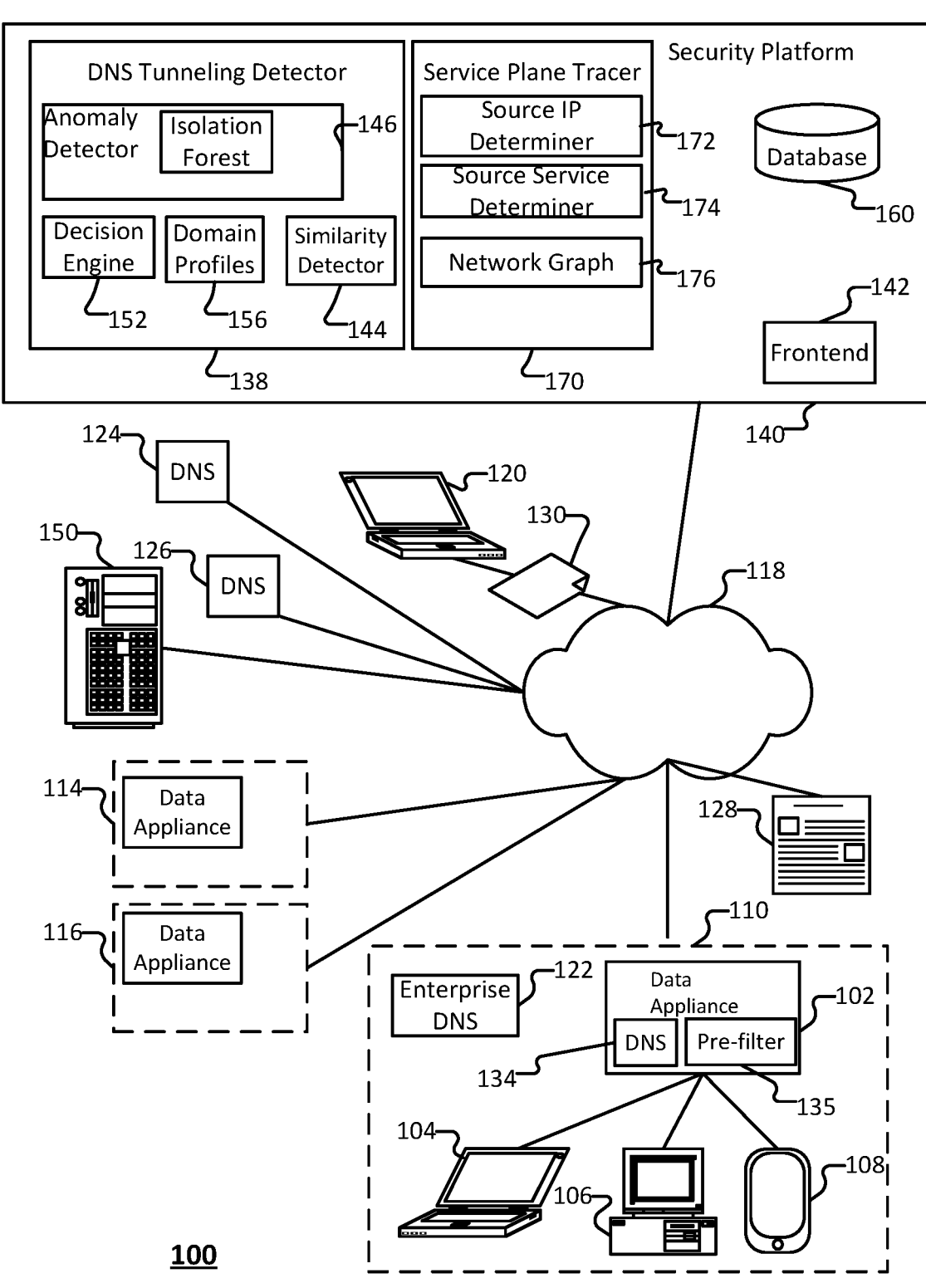
FIG. 1 is a block diagram of an environment in which services are deployed in connection with providing network security according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, service plane may mean the collection of services implemented in connection with an application service. For example, the service plane may be defined by the downstream and upstream connections or dependencies among the collection of services comprised in an application service.

The problems arising from the complexity of the service to service communication may be addressed by defining a catalog of the dependencies among the services in the application service. However, because the services in the service to service communication continue to change, a dynamic catalog better addresses those problems. Various related art mechanisms may analyze the service catalog to define the interconnectedness, however, maintaining an up-to-date catalog is difficult. Further, the related art mechanisms for defining the catalog incur significant costs to deploy the mechanisms across various application platforms, deployment designs, and/or container orchestration environments.

A solution for defining and dynamically updating the catalog is to use a network call graph to identify the dependencies through service calls, etc. The call graph inside the service catalog may be used in connection with enabling the definition or assessment of access, permissions, exposure, privileges, mis-configurations, vulnerability, etc.

Some related art systems define the service to service communication and dependency graph based at least in part on identifying the call graph. However, such related art systems are intrusive or are not widely standardized to have an effective solution across various application deployments. For example, the intrusiveness of such related art systems require a configuration of, or installation of agents to, customer application services. Some customers may be hesitant to allow service communication and network analysis tools to be deployed in such an intrusive manner.

A first related art system uses a distributed tracing and application performance management tools, such as via deployment of an agent(s) that must be configured and installed on an application service deployment that captures the communication between microservices. However, the agents are specifically configured for the environment. In other words, the agent serves only the specific environment in which the agent is deployed and significant development work is required to deploy a similar agent on different environments with different configurations.

A second related system uses a network packet capture via deployment of an agent in the service network or subnet (e.g., within the customer's application service deployment).

The agent performs the log packet capture by performing a heuristic check to determine the services that interact with each other.

A third related art system uses a sidecar proxy. For example, each service within the application service comprises a sidecar, and the communication to/from the service is routed through the sidecar. The sidecar is served as a proxy that captures all information to/from the service. Such related art systems are expensive and unscalable. As an example, in some environments (e.g., Kubernetes), internal network and packet routing may be very complicated and depends in some cases on customer implementations involving communication network interfaces (CNIs), routing, IP Virtual Servers (IPVS)/iptables, etc.

Various embodiments dynamically infer the catalog of dependencies in the service network/subnet from the running of the system. For example, the system determines an initial catalog (e.g., initial blueprint) of connectivity, and dynamically analyzes the service to service communication to identify new dependencies or removed dependencies, such as from the addition or removal of new services to the application service.

Various embodiments include a system, method, and device for performing discovery of service to service communication traffic. In some embodiments, the performing discovery of service to service communication traffic includes (i) determining, based at least in part on one or more Domain Name System (DNS) logs, a source Internet Protocol (IP) address based on a resolved record for a requested service, (ii) determining a source service based at least in part on performing a lookup in a service registry based at least in part on the source IP address, and (iii) generating, based at least in part on the source service associated with the source IP, a network graph for an application service comprising the source service and the requested service.

In some embodiments, the system comprises a service that is deployed outside the application service for which the catalog of dependencies of the service plane is being determined. For example, the system uses a security service (e.g., also referred to herein as a security scanning service) that communicates with one or more services/modules within the service network/subnet (e.g., the customer's service network) and uses such information in connection with determining the dependencies and interconnectedness. In some embodiments, the security service obtains information from the Domain Name System (DNS) service within the service plane. The security service determines a connection between a source service and a requested service based at least in part on the information obtained from the DNS service.

In some embodiments, the security service queries DNS log (e.g., a snapshot of a DNS log) maintained by the DNS service. For example, the security service queries the DNS log based at least in part on a particular service (e.g., the requested service) within the service network/subnet to determine the IP address for source service (e.g., the source IP address) that calls the requested service. In some embodiments, the security service determines the particular source service corresponding to the source IP address.

In some embodiments, the security service determines the particular source service corresponding to the IP address based at least in part on obtaining information from a service registry. As an example, the service registry is deployed within the customer service plane. The security service queries the service registry to determine the source service. For example, the security service uses queries to the service registry based at least in part on the source IP address that the security service obtained from the DNS log.

In response to determining the source service corresponding to the source IP address, the system associates the source service with the requested service. For example, the system updates the catalog of dependencies/connections among services in the application service to include an association (e.g., a dependency or connection) between the source service and the requested service. As another example, the system generates or updates a network graph based on the association between the source service and the requested service. In some embodiments, the system periodically updates the catalog. Periodic updates to the catalog may include iteratively capturing a snapshot of the DNS log for the application service, and analyze the records in the snapshot of the DNS log to obtain source IP addresses, which the system uses to query the service registry to determine the corresponding source services. The periodic update to the catalog may be in accordance with a predefined time interval, which may be configurable such as by an administrator.

In response to obtaining (e.g., determining) the network graph or catalog of dependencies/connections for a service plane, the system may analyze the network graph or catalog to determine whether the application service has a vulnerability, mis-configuration, etc. In some embodiments, the system determines whether a dependency or connection between a subset of service is to be updated, such as based on a determination that a particular source service exposes access to another service such as via a requested service. For example, the system may determine that an endpoint may infiltrate and access the other service by tracing the connection between the source service and the requested service and accessing the other service (e.g., the inadvertently exposed service) via the requested service or one or more intervening services between the requested service and the other service. As another example, the system troubleshoots misconfigurations of one or more services in the service plane based on a determination that a connection between a source service and a requested service is improper or an inefficient path for a transaction flow through the application service.

Various embodiments improve the analysis/definition of the service to service communication and dependency catalog. Various embodiments provide a robust mechanism for defining the dependencies and/or connections between services that is non-intrusive, extensible across various types of deployments/environments, etc. For example, some embodiments do not require an agent or other service to be deployed within the service plane (e.g., within a customer's application service deployment). Rather, the service plane (e.g., customer's application service deployment) may enable various embodiments to perform the tracing of the dependencies/connections (e.g., in connection with generating/updating the network graph) in response to the security service being provided with permissions to access the DNS service and the service registry. For example, the customer service deployment is configured to enable security service (e.g., external to the service network/subnet) to query the DNS service and the service registry and to enable the DNS service and the service registry to provide the information (e.g., responses to the querying) to the security service.

FIG. 1 is a block diagram of an environment in which services are deployed in connection with providing network security according to various embodiments. In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy) regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. In some embodiments, data appliance 102 is also configured to enforce policies with respect to traffic that stays within (or from coming into) enterprise network 110.

In the example shown, data appliance 102 is an inline security entity. Data appliance performs low-latency processing/analysis of incoming data (e.g., traffic data) and determines whether to offload any processing of the incoming data to a cloud system, such as security platform 140.

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in an enterprise network 110. Client device 120 is a laptop computer present outside of enterprise network 110.

Data appliance 102 can be configured to work in cooperation with a remote security platform 140. Security platform 140 may be a cloud system such as a cloud service security entity. Security platform 140 can provide a variety of services, including performing container image vulnerability analysis, over privileged or anomalous access, cloud resource misconfiguration, network and data exfiltration, static and dynamic analysis on malware samples, tracing a network graph of an application service, detecting vulnerabilities in the service plane, determining dependencies or connections between services in the service plane, detecting exposure of services to other services or to endpoints such as a clients system used by a user, providing a list of signatures of known exploits (e.g., malicious input strings, malicious files, etc.) to data appliances, such as data appliance 102 as part of a subscription, detecting exploits such as malicious input strings or malicious files (e.g., an on-demand detection, or periodical-based updates to a mapping of input strings or files to indications of whether the input strings or files are malicious or benign), providing a likelihood that an input string or file is malicious or benign, providing/updating a whitelist of input strings or files deemed to be benign, providing/updating input strings or files deemed to be malicious, identifying malicious input strings, detecting malicious input strings, detecting malicious files, predicting whether an input string or file is malicious, and providing an indication that an input string or file is malicious (or benign). In various embodiments, results of analysis of files or traffic (and additional information pertaining to applications, domains, etc.) or analysis of the network graph of the service plane are stored in database 160. In various embodiments, security platform 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 140 but may also be provided by a third party. As one example, the virtual machine server can rely on EC2, with the remainder portions of security platform 140 provided by dedicated hardware owned by and under the control of the operator of security platform 140.

In some embodiments, system 100 uses security platform 140 to perform processing with respect to traffic data offloaded by data appliance 102. Security platform 140 provides one or more services to data appliance 102, client device 120, etc. Examples of services provided by security platform 140 (e.g., the cloud service entity) include a data loss prevention (DLP) service, an application cloud engine (ACE) service (e.g., a service for identifying a type of application based on a pattern or fingerprint of traffic), Machine learning Command Control (MLC2) service, an advanced URL filtering (AUF) service, a threat detection service, an enterprise data leak service (e.g., detecting data leaks or identifying sources of leaks), an Internet of Things (IoT) service. Various other service may be implemented.

According to various embodiments, security platform 140 comprises DNS tunneling detector 138 and/or service plane tracer 170. In some embodiments, security platform 140 comprises one or more modules that provide security services with respect to files/traffic communicated across a network or application service. For example, security platform 140 may comprise a malicious traffic detector that analyzes traffic through the network/service plane.

In some embodiments, system 100 (e.g., service plane tracer 170, security platform 140, etc.) determines dependencies and/or connections between service in a service plane of an application service (e.g., a customer's instance of the application service). System 100 determines a dependency or connection between two services based at least in part on a DNS log for communications among services in the service plane. For example, system 100 uses service plane tracer 170 to determine a source IP address associated with a record in the DNS log (e.g., a source IP address associated with a call to a particular requested service). In response to obtaining the source IP address, service plane tracer 170 determines a source service (e.g., an identifier for the source service) associated with the source IP address.

In some embodiments, service plane tracer 170 comprises source IP determiner 172, source service determiner 174, and network graph 176. Service plane tracer 170 may further comprise one or more other modules to be used in connection with evaluating the network graph, such as to detect vulnerabilities, etc.

Service plane tracer 170 uses source IP determiner 172 to determine, based at least in part on a DNS log for the service plane, an IP address for a source service that called a requested service. For example, source IP determiner 172 queries the DNS log (or a DNS log snapshot) for an indication of a requested service associated with a call recorded in the DNS log and a source IP address corresponding to the service that was calling the requested service. Accordingly, source IP determiner 172 determines the source IP address for the source service based at least in part on a record in the DNS log.

Service plane tracer 170 uses source service determiner 174 to determine, based at least in part on a service registry, a source service associated with the source IP address obtained by source IP determiner 172. For example, the service registry stores a mapping of source services (e.g., identifiers of the source services) to source IP addresses. Source service determiner 174 queries the service registry based at least in part on the source IP address obtained by source IP determiner 172 and obtains the identifier for the source service associated with the particular record for which the source service is determined.

Service plane tracer 170 uses network graph 176 to store a set of associations among services comprised in the service plane. For example, service plane tracer 170 iterates over the records in the DNS log to use such information as a proxy for dependencies or connections in the service network/subnet. In response to determining associations between two services (e.g., based on a particular record in the DNS log), service plane tracer 170 stores the association in network graph 176.

In some embodiments, service plane tracer 170 periodically updates network graph 176. For example, service plane tracer 170 may cause a snapshot of the DNS log to be taken according to a predetermined frequency (e.g., at predetermined time intervals). Service plane tracer 170 then uses the DNS log to iterate over the records in the log (e.g., at least the new records in the DNS log) and updates network graph 176 with new associations between services.

Returning to FIG. 1, suppose that a malicious individual (using client device 120) has created malware or malicious input string 130. The malicious individual hopes that a client device, such as client device 104, will execute a copy of malware or other exploit 130 (e.g., malware or malicious input string), compromising the client device, and causing the client device to become a bot in a botnet. The compromised client device can then be instructed to perform tasks (e.g., cryptocurrency mining, or participating in denial-of-service attacks) and/or to report information to an external entity (e.g., associated with such tasks, exfiltrate sensitive corporate data, etc.), such as command and control (C&C) server 150, as well as to receive instructions from C&C server 150, as applicable.

The environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). DNS server 126 is publicly accessible but under the control of the malicious operator of C&C server 150. Enterprise DNS server 122 is configured to resolve enterprise domain names into IP addresses and is further configured to communicate with one or more external DNS servers (e.g., DNS servers 124 and 126) to resolve domain names as applicable.

In order to connect to a legitimate domain (e.g., www.example.com depicted as website 128), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C&C server 150, client device 104 will need to resolve the domain, "kj32hkjqfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C&C server 150 to receive data from client device 104.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110. In some embodiments, a security policy includes an indication that network traffic (e.g., all network traffic, a particular type of network traffic, etc.) is to be classified/scanned by a classifier stored in local cache or otherwise that certain detected network traffic is to be further analyzed (e.g., using a finer detection model) such as by offloading processing to security platform 140.

In various embodiments, data appliance 102 includes a DNS module 134, which is configured to facilitate determining whether client devices (e.g., client devices 104-108) are attempting to engage in malicious DNS tunneling, and/or prevent connections (e.g., by client devices 104-108) to malicious DNS servers. DNS module 134 can be integrated into data appliance 102 (as shown in FIG. 1) and can also operate as a standalone appliance in various embodiments. And, as with other components shown in FIG. 1, DNS module 134 can be provided by the same entity that provides data appliance 102 (or security platform 140) and can also be provided by a third party (e.g., one that is different from the provider of data appliance 102 or security platform 140). Further, in addition to preventing connections to malicious DNS servers, DNS module 134 can take other actions, such as individualized logging of tunneling attempts made by clients (an indication that a given client is compromised and should be quarantined, or otherwise investigated by an administrator).

In various embodiments, when a client device (e.g., client device 104) attempts to resolve a domain, DNS module 134 uses the domain as a query to security platform 140. This query can be performed concurrently with resolution of the domain (e.g., with the request sent to DNS servers 122, 124, and/or 126 as well as security platform 140). As one example, DNS module 134 can send a query (e.g., in the JSON format) to a frontend 142 of security platform 140 via a REST API. Using processing described in more detail below, security platform 140 will determine (e.g., using DNS tunneling detector 138 such as decision engine 152 of DNS tunnelling detector 138) whether the queried domain indicates a malicious DNS tunneling attempt and provide a result back to DNS module 134 (e.g., "malicious DNS tunneling" or "non-tunneling").

In various embodiments, when a client device (e.g., client device 104) attempts to resolve an SQL statement or SQL command, or other command injection string, data appliance 102 uses the corresponding sample (e.g., an input string) as a query to a local cache and/or security platform 140. This query can be performed concurrently with resolution of the SQL statement, SQL command, or other command injection string. As one example, data appliance 102 sends a query (e.g., in the JSON format) to a frontend 142 of security platform 140 via a REST API. As another example, data appliance 102 sends the query to security platform 140 (e.g., a frontend 142 of security platform 140) directly from a data plane of data appliance 102. For example, a process running on data appliance 102 communicates the query (e.g., request message) to security platform 140 without the query being first communicated to the message plane of data appliance 102, which in turn would communicate the query to security platform 140. For example, data appliance 102 is configured to use a process running on a data plane to query security platform 140 without mediation via a management plane of data appliance 102. Using processing described in more detail below, security platform 140 will determine (e.g., using security platform 140) whether the queried SQL statement, SQL command, or other command injection string indicates an exploit attempt and provide a result back to data appliance 102 (e.g., "malicious exploit" or "benign traffic").

In various embodiments, when a client device (e.g., client device 104) attempts to open a file or input string that was received, such as via an attachment to an email, instant message, or otherwise exchanged via a network, or when a client device receives such a file or input string, DNS module 134 uses the file or input string (or a computed hash or signature, or other unique identifier, etc.) as a query to security platform 140. This query can be performed contemporaneously with receipt of the file or input string, or in response to a request from a user to scan the file. As one example, data appliance 102 can send a query (e.g., in the JSON format) to a frontend 142 of security platform 140 via a REST API. The query can be communicated to security platform by a process/connector implemented on a data plane of data appliance 102. Using processing described in more detail below, security platform 140 will determine (e.g., using a malicious file detector that uses a machine learning model to detect/predict whether the file is malicious) whether the queried file is a malicious file (or likely to be a malicious file) and provide a result back to data appliance 102 (e.g., "malicious file" or "benign file").

In various embodiments, DNS tunneling detector 138 (whether implemented on security platform 140, on data appliance 102, or other appropriate location/combinations of locations) uses a two-pronged approach in identifying malicious DNS tunneling. The first approach uses anomaly detector 146 (e.g., implemented using python) to build a set of real-time profiles (156) of DNS traffic for root domains.

The second approach uses signature generation and matching (also referred to herein as similarity detection, and, e.g., implemented using Go). The two approaches are complementary. The anomaly detector serves as a generic detector that can identify previously unknown tunneling traffic. However, the anomaly detector may need to observe multiple DNS queries before detection can take place. In order to block the first DNS tunneling packet, similarity detector 144 complements anomaly detector 146 and extracts signatures from detected tunneling traffic which can be used to identify situations where an attacker has registered new malicious tunneling root domains but has done so using tools/malware that is similar to the detected root domains.

As data appliance 102 receives DNS queries (e.g., from DNS module 134), data appliance 102 provides them to security platform 140 which performs both anomaly detection and similarity detection, respectively. In various embodiments, a domain (e.g., as provided in a query received by security platform 140) is classified as a malicious DNS tunneling root domain if either detector flags the domain.

DNS tunneling detector 138 maintains a set of fully qualified domain names (FQDNs), per appliance (from which the data is received), grouped in terms of their root domains (illustrated collectively in FIG. 1 as domain profiles 156). (Though grouping by root domain is generally described in the Specification, it is to be understood that the techniques described herein can also be extended to arbitrary levels of domains.) In various embodiments, information about the received queries for a given domain is persisted in the profile for a fixed amount of time (e.g., a sliding time window of ten minutes).

As one example, DNS query information received from data appliance 102 for various foo.com sites is grouped (into a domain profile for the root domain foo.com) as: G(foo.com)=[mail.foo.com, coolstuff.foo.com, domain1234.foo.com]. A second root domain would have a second profile with similar applicable information (e.g., G(baddomain.com)=[lskjdf23r.baddomain.com, kj235hdssd233.baddomain.com]. Each root domain (e.g., foo.com or baddomain.com) is modeled using a set of characteristics unique to malicious DNS tunneling, so that even though benign DNS patterns are diverse (e.g., k2jh3i8y35.legitimatesite.com, xxx888222000444.otherlegitimatesite.com), such DNS patterns are highly unlikely to be misclassified as malicious tunneling. The following are example characteristics that can be extracted as features (e.g., into a feature vector) for a given group of domains (i.e., sharing a root domain).

In some embodiments, service plane tracer 170 provides to an application service or a client system an indication of the network graph for the corresponding service network/subnet or an indication of a vulnerability of the service plane. For example, in response to determining that a service is improperly exposed to another service or another third party system, service plane tracer 170 may generate and communicate an alert to an administrator of the application service to alert the administrator of the improper exposure of the service.

Figure 2:
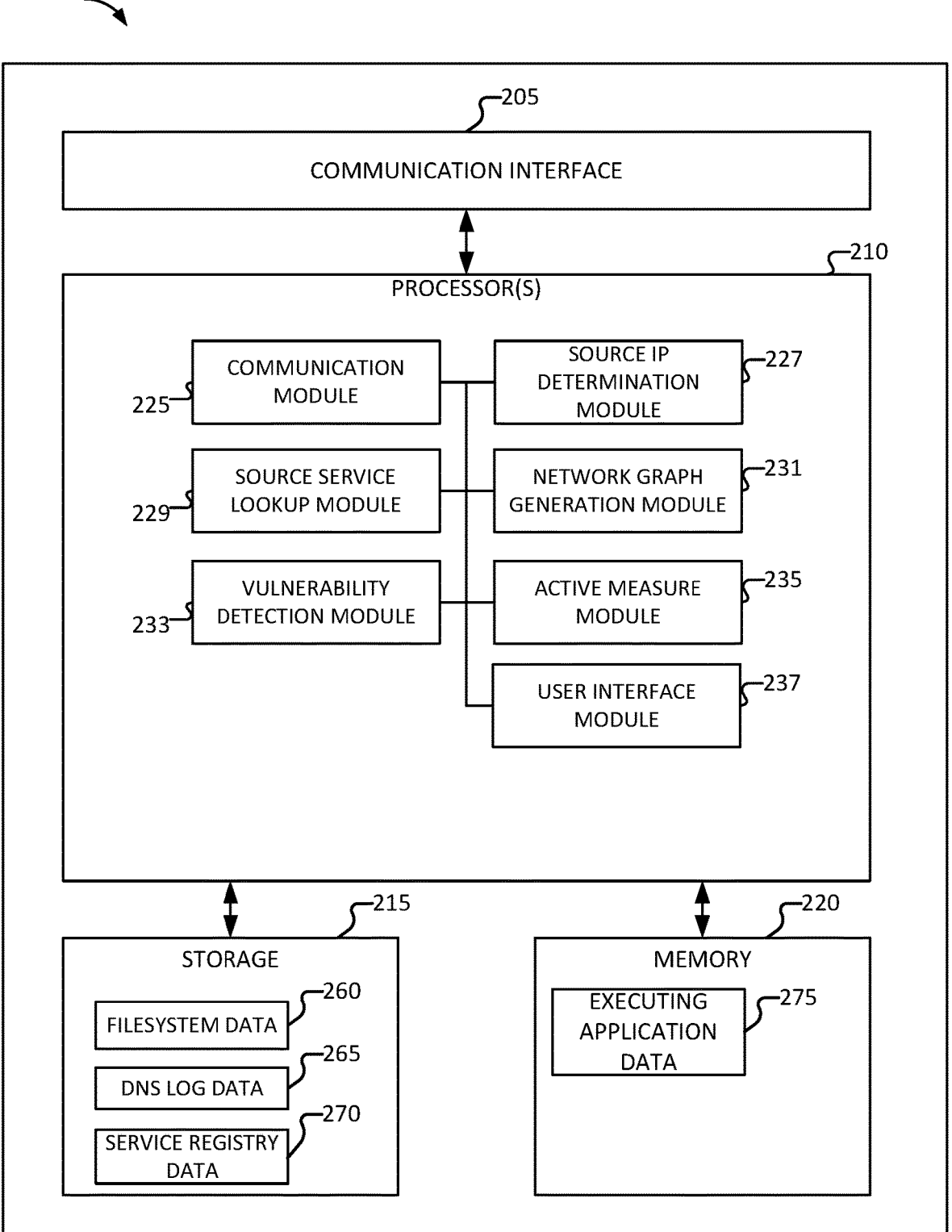
FIG. 2 is a bock diagram of a service plane tracer system according to various embodiments.

FIG. 2 is a bock diagram of a service plane tracer system according to various embodiments. According to various embodiments, system 200 is implemented in connection with system 100 of FIG. 1, such as for service plane tracer 170. In various embodiments, system 200 is implemented in connection with process 400 of FIG. 4, process 500 of FIG. 5, process 600 of FIG. 6, process 700 of FIG. 7, and/or process 800 of FIG. 8. System 200 may be implemented in one or more servers, a security entity such as a firewall, and/or an endpoint.

System 200 can be implemented by one or more devices such as servers. System 200 can be implemented at various locations on a network. In some embodiments, system 200 implements service plane tracer 170 of system 100 of FIG. 1. As an example, system 200 is deployed as a service, such as a web service (e.g., system 200 determines traces application service communication/calls among services in the service plane). The service may be provided by one or more servers (e.g., system 200 is deployed on a remote server that analyzes DNS log data to generate or update). As another example, the service plane tracer is deployed on a firewall.

According to various embodiments, system 200 determines associations between services within a service plane. For example, system 200 determines dependencies/connections between services in the service plane. In some embodiments, system 200 determines the associations between services based at least in part on a DNS log. For example, system 200 obtains a snapshot of a DNS log (e.g., a DNS log maintained by a service within the service plane), and determines the associations based on a record in the DNS log, which stores information pertaining to a source service and a requested service. System 200 queries a record in the DNS log (e.g., the DNS log snapshot) and obtains an indication of a requested service associated with the record and a source IP address for a source service associated with the record (e.g., a source service that had made a call to the requested service). System 200 uses the source IP address to perform a reverse lookup to determine an identifier for the source service, such as a name of the source service. As an example, system 200 queries a service registry (e.g., a registry maintained within the service plane) based at least in part on the source IP address to obtain the identifier for the source service.

In some embodiments, in response to determining the source service and the requested service associated with a record in the DNS log (e.g., the DNS log snapshot), system 200 generates or updates a network graph. For example, system 200 stores an association between the source service and the requested service.

In some embodiments, system 200 evaluates the associations between services in the service plane in connection with assessing access, permissions, exposure, privileges, mis-configurations, vulnerability, etc. within the service plane. For example, system 200 uses the generated network graph to evaluate the service plane.

In the example shown, system 200 implements one or more modules in connection with generating or updating a network graph and/or evaluating the service plane (e.g., for vulnerabilities, mis-configurations, permissions, service access, etc.). System 200 comprises communication interface 205, one or more processors 210, storage 215, and/or memory 220. One or more processors 210 comprises one or more of communication module 225, source IP determination module 227, source service lookup module, network graph generation module 231, vulnerability detection module 233, active measure module 235, and/or user interface 237.

In some embodiments, system 200 comprises communication module 225. System 200 uses communication module 225 to communicate with services within a service plane, or various nodes or end points (e.g., client terminals, firewalls, DNS resolvers, data appliances, other security entities, etc.) or user systems such as an administrator system. For example, communication module 225 provides to communication interface 205 information that is to be communicated (e.g., to another node, security entity, etc.). As another example, communication interface 205 provides to various other modules within system 200 information that communication interface 205 receives, such as from communicating with a service in a service plane. Communication module 225 is configured to receive information pertaining to tracings within a service plane, such as a DNS log snapshot, a record comprised in the DNS log, and/or information comprised in a DNS log record, such as source IP address, requested service. Communication module 225 is configured to receive information pertaining to a source service, such as an identifier for the source service (e.g., a name of the source service). Communication module 225 is configured to communicate with one or more services within an application service (e.g., with in the service plane of the application service), such as a DNS service and/or a service registry.

Communication module 225 is configured to receive one or more settings or configurations from an administrator. Examples of the one or more settings or configurations include configurations of a process determining an association between services, a process for generating a network graph, a process for evaluating the associations between services, such as a process for detecting vulnerabilities in the service plane, etc.

In some embodiments, system 200 comprises source IP determination module 227. System 200 uses source IP determination module 227 to determine a source IP address for a source service that has a dependency or connection with another service (e.g., a requested service). For example, source IP determination module 227 is configured to query a DNS log for an indication of a requested service associated with a particular DNS log record and a corresponding source IP address for the DNS log record. Source IP determination module 227 may query a DNS service within an application service for which a network graph is being generated, updated or evaluated. For example, source IP determination module 227 queries the DNS service for an indication of the requested service and corresponding source IP address for a DNS log record. As another example, source IP determination module 227 obtains from the DNS service a snapshot of the DNS log from which source IP determination module 227 obtains (e.g., queries the locally stored DNS log snapshot) the information pertaining to the requested service and the source IP address for a DNS log record.

In some embodiments, system 200 comprises source service lookup module 229. System 200 uses source service lookup module 229 to determine the source service corresponding to the source IP address obtained by source IP determination module 227. For example, service lookup module 229 queries a service registry associated with the application service/service plane (e.g., a service registry comprised in the service plane). Service lookup module queries the service registry based at least in part on the source IP address obtained from the DNS log record. In response to querying the service registry, service lookup module 229 obtains an identifier associated with the source service, such as a name of the source service.

In some embodiments, system 200 comprises network graph generation module 231. System 200 uses network graph generation module 231 to store associations among services within the service plane. For example, system 200 uses network graph generation module 231 to generate a network graph of the service plane based on dependencies or connections traced based on information pertaining to calls to services in the service plane (e.g., records of which are stored in the DNS log).

In some embodiments, system 200 comprises vulnerability detection module 233. System 200 uses vulnerability detection module 233 to evaluate the network graph. Vulnerability detection module 233 detects vulnerabilities in the service plane based on the network graph, such as by detecting whether a particular service can directly or indirectly access another service that is in contravention of a security policy. Malicious users often attempt to penetrate to one or more services within an application service based on using another service as an entry point and tracing connections among services in the service plane to reach the desired one or more services to be exploited. Vulnerability detection module 233 traces the network graph to assess whether a dependency or connection between services in the service plane unintentionally expose another service within the service plane. System 200 may also use vulnerability detection module 233 to detect misconfigurations, etc. in the service plane. For example, vulnerability detection module 233 may detect dependencies or connection for a service that no longer exists in the service plane. As another example, vulnerability detection module 233 detects a new service in the service plane for which dependencies or connections are misconfigured, such as if the service plane is not properly connected to another service.

In some embodiments, system 200 comprises active measure module 235. System 200 uses active measure module 235 to perform an active measure in response to detecting access, permissions, exposure, privileges, mis-configurations, vulnerability, etc. For example, in response to detecting a vulnerability, active measure module 235 provides (e.g., generates and communicates) an indication of the vulnerability, such as via a prompt provided on a user interface. Active measure module 235 may store a mapping of vulnerabilities to active measures, and in response to detecting a particular vulnerability, active measure module 235 queries the mapping to determine the applicable active measure, and implements the active measure determined based on the mapping. Active measure module 235 may store similar mappings of other detected states (e.g., permissions, mis-configurations, exposure, etc.) to active measures.

In some embodiments, system 200 comprises user interface module 237. System 200 uses user interface module 237 to configure and provide a user interface via which system 200 provides and receives information, such as to another system (e.g., a client system or administrator system). User interface module 237 is configured to provide notifications to another system, such as in connection with alerting the other system of a vulnerability, etc.

According to various embodiments, storage 215 comprises one or more of filesystem data 260, DNS log data 265, and/or service registry data 270. Storage 215 comprises a shared storage (e.g., a network storage system) and/or database data, and/or user activity data.

In some embodiments, filesystem data 260 comprises a database such as one or more datasets, a whitelist of files or traffic deemed to be safe (e.g., not suspicious, benign, etc.), a blacklist of files or traffic deemed to be suspicious or malicious, information associated with suspicious or malicious files, information associated with a service plane, one or more policies or configurations for the service plane or application service (e.g., a security policy), etc.

DNS log data 265 comprises information pertaining to a DNS log maintained by an application service, such as by a DNS service within the service plane. As an example, DNS log data 265 comprises a snapshot of the DNS log maintained by the application service. As another example, DNS log data comprises information pertaining to a record in the DNS log, such as source IP address, record type, and identifier for the requested service (e.g., a requested service name).

Service registry data 270 comprises information pertaining to a service and/or endpoint registry for an application service, such as a service registry mapping service names to corresponding IP addresses. In some embodiments, service registry data 270 is used in connection with performing a reverse lookup using the source IP address obtained from the DNS log.

According to various embodiments, memory 220 comprises executing application data 275. Executing application data 275 comprises data obtained or used in connection with executing an application such as an application executing a malicious file or traffic detection process, an application executing a tracing of a service plane for an application service to determine a network graph, etc. In embodiments, the application comprises one or more applications that perform one or more of receive and/or execute a query or task, generate a report and/or configure information that is responsive to an executed query or task, and/or provide to a user information that is responsive to a query or task. Other applications comprise any other appropriate applications (e.g., an index maintenance application, a communications application, a machine learning model application, an application for detecting suspicious files, a document preparation application, a report preparation application, a user interface application, a data analysis application, an anomaly detection application, a user authentication application, a security policy management/update application, etc.).

Figure 3:
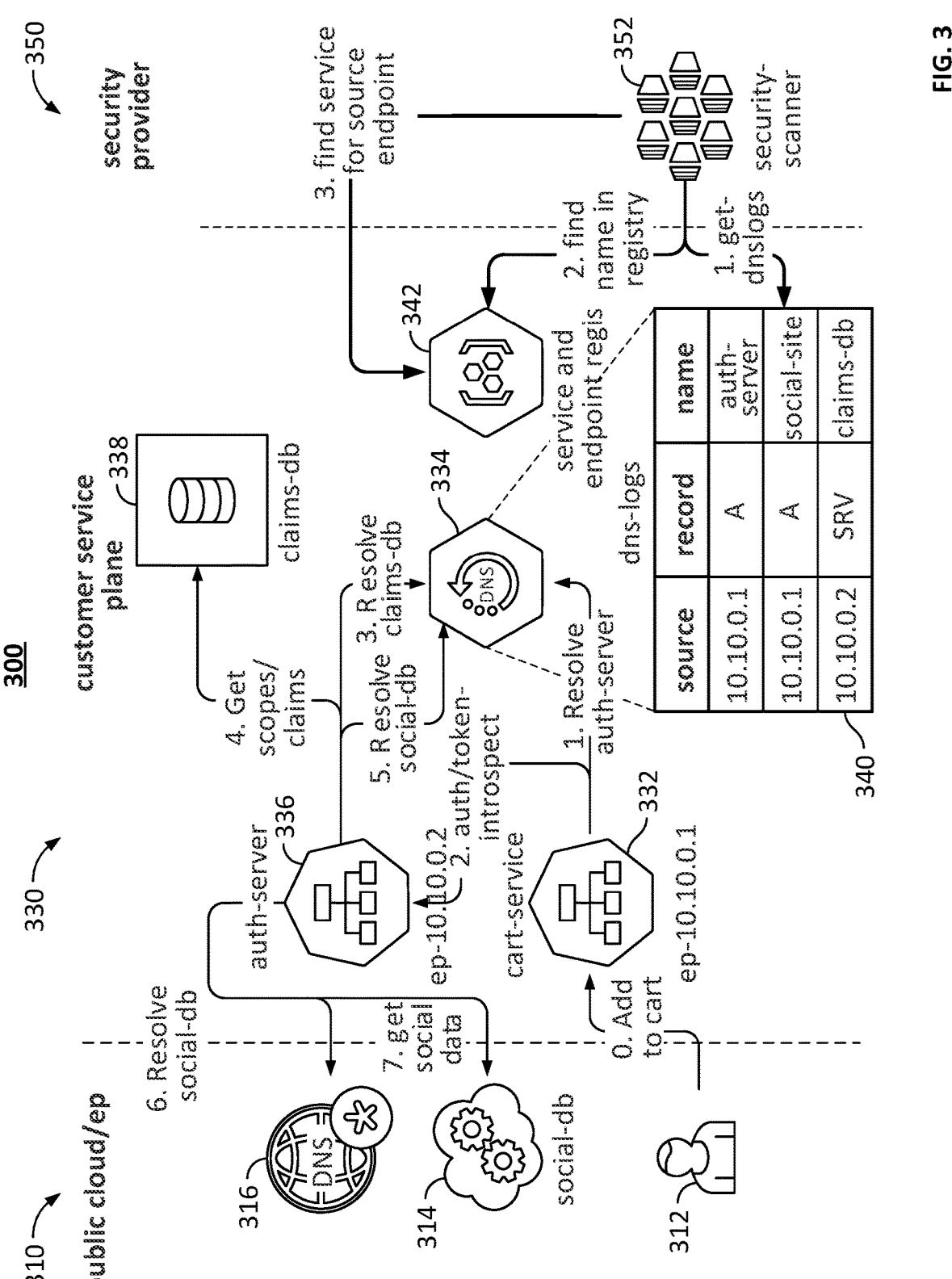
FIG. 3 illustrates a system diagram of a network according to various embodiments.

FIG. 3 illustrates a system diagram of a network according to various embodiments. In some embodiments, system 300 is implemented at least in part by system 100 of FIG. 1 and/or system 200 of FIG. 2. For example, security provider 350 may be implemented by security platform 140 of system 100. As another example, security scanner 352 (e.g., a security service) is implemented by system 200 of FIG. 2 and/or service plane tracer 170 of system 100.

In the example shown, system 300 comprises service plane 330 that includes a plurality of services (e.g., microservices) that are deployed in an environment (e.g., a customer instance). The environment may be managed by an administrator(s) of an organization associated with service plane 330. In some embodiments, service plane 330 interfaces with public cloud 310, such as in connection with providing a service to an endpoint 312 (e.g., a user using a clients system) or in connection with accessing information from a service that is external to the organization (e.g., a third party service). In some embodiments, service plane 330 interfaces with security provider 350, such as in connection with obtaining security services. For example, security provider 350 is a third party service that provides security services to the service plane 330.

According to various embodiments, security provider 350 comprises security scanner 352 that is deployed to generate and maintain (e.g., update) a network graph for service plane 330. The network graph may be used in connection with the evaluation of the dependencies and/or connections among services in service plane 330. Security scanner 352 is deployed in connection with service plane 330 by configuring service plane 330 to interface with security scanner 352, such as by providing security scanner 352 with permission to obtain information from one or more services (e.g., a subset of service in service plane 330). For example, service plane 330 is configured to provide security scanner 352 (or security provider 350, generally) with access to DNS service 334 and/or service and endpoint registry 342. Because security scanner 352 can access/query DNS service 334 and/or service and endpoint registry 342, security scanner 352 is enabled to generate and maintain a network call graph (e.g., a service network call graph). For example, security scanner 352 queries DNS service 334 and/or service and endpoint registry 342 in connection with performing distributed tracing among services within service plane 330 and/or generating a network graph. The network graph may be used to define and/or assess access, permissions, exposure, privileges, mis-configurations, and vulnerabilities of service plane 330 or among services within service plane 330.

In some embodiments, DNS service 334 stores DNS log 340 comprising records for calls performed during execution of the application service. For example, DNS log 340 stores data pertaining to communications among cart service 332, authentication service 336, database service 338, or a third party service available on the public cloud, such as third party services 314, 316.

In some embodiments, in response to service plane 330 being configured to enable security scanner 352 to access DNS service 334 and service and endpoint registry 342, security scanner 352 queries DNS service 334 and service and endpoint registry 342 for information with which security scanner 352 generates and maintains the network graph. In connection with generating/updating the network graph, security scanner 352 queries the DNS service 334 for a record in the DNS log, which is maintained by DNS service 334. The querying of DNS service 334 may include capturing a snapshot of the DNS log being maintained. In some embodiments, the DNS log snapshot is stored at security scanner 352 (e.g., for processing and generation of the network graph). However, the DNS log snapshot may be stored at DNS service 334, and used to service queries from security scanner 352.

In response to capturing the DNS log snapshot, security scanner 352 queries records from the DNS log snapshot. Name resolution in many popular deployed environments are standardized to DNS services. The DNS logs can be captured and analyzed periodically to obtain the source IP address and the resolved record. The source IP address can then be looked up in a registry of services and matched with the endpoint or service (e.g., the source service). For example, the security scanner 352 iteratively analyzes the records in the DNS log snapshot and obtains the requested service (e.g., an identifier for the requested service) and a source IP address for the service corresponding to the call of the requested service being logged in the record. In some embodiments, security scanner 352 queries the DNS log snapshot on a record-by-record basis and iteratively obtains the source IP addresses for a plurality of records in the DNS log snapshot. In some embodiments, security scanner 352 batch queries the DNS log snapshot for a plurality of source IP addresses corresponding to the records in the batch. As an example, a batch may comprise a predefined number of records. As another example, the batch may correspond to all records in the DNS log snapshot.

In response to obtaining the source IP address, security scanner 352 queries service and endpoint registry 342 for an identifier of a service corresponding to the source IP address (e.g., an identifier of the service that had called the requested service associated with a particular record in the DNS log snapshot). In response to receiving the query, service and endpoint registry 342 performs a lookup for the service matching the source IP address comprised in the query and returns the identifier for the service (e.g., a name for the source service). In some embodiments, security scanner 352 queries service and endpoint registry 342 on a record-by-record basis and iteratively obtains the identifier for the service matching the source IP address associated with the query. In some embodiments, security scanner 352 batch queries service and endpoint registry 342 for a plurality of identifiers for services corresponding to the source IP addresses in the batch (e.g., the source IP addresses for the records in the batch). As an example, a batch may comprise a predefined number of records. As another example, the batch may correspond to all records in the DNS log snapshot.

In response to obtaining the identifier for the source IP address associated with the query (e.g., a record in the DNS log snapshot), security scanner 352 generates or updates a network graph (e.g., the network call graph tracing calls among services in service plane 330).

In some embodiments, security scanner 352 is configured to generate or update the network graph based at least in part on (i) extracting a source IP address, name of the requested service (e.g., S'Target) from a record in the DNS log (e.g., the DNS log snapshot), (ii) for the source IP obtained in (i), query service and endpoint registry 342 to obtain a named source service ($S^{Source}$) which is served by the container using such an IP address, (iii) draw edges for service plane 330 (e.g., draw the edges for the server-to-server environment) with the information $V^{Source}-E^{name}\rightarrow V^{Target}$, where $V^{Source}$ and $V^{Target}$ correspond to the vertices for the source service and the requested service in the network graph (e.g., the service dependency graph in the service plane), and $E^{name}$ corresponds to the name or label of the dependency it can represent, such as a protocol (e.g., http, jdbc, etc.) or function (e.g., storage). As an example, in connection with extracting the source IP address and name of the requested service in (i), security scanner 352 may also extract a record type from the DNS log record. As another example, if the record type for a record being analyzed is SRV, security scanner 352 further obtains information pertaining to the port and service type (e.g., for a log line similar to: _service._proto.name. TTL class type of record priority weight port target). The _service($E^{Name}$) and port($E^{Name}$) are extra informational value to identify the platform services and clients which support DNS SRV records and querying.

Security scanner 352 may be configured to determine whether service plane 330 exposes a service to endpoint 312 (e.g., a user accessing the service plane via a client system) in contravention of a security policy or permissions for the user accessing the application service via endpoint 312.

Figure 4:
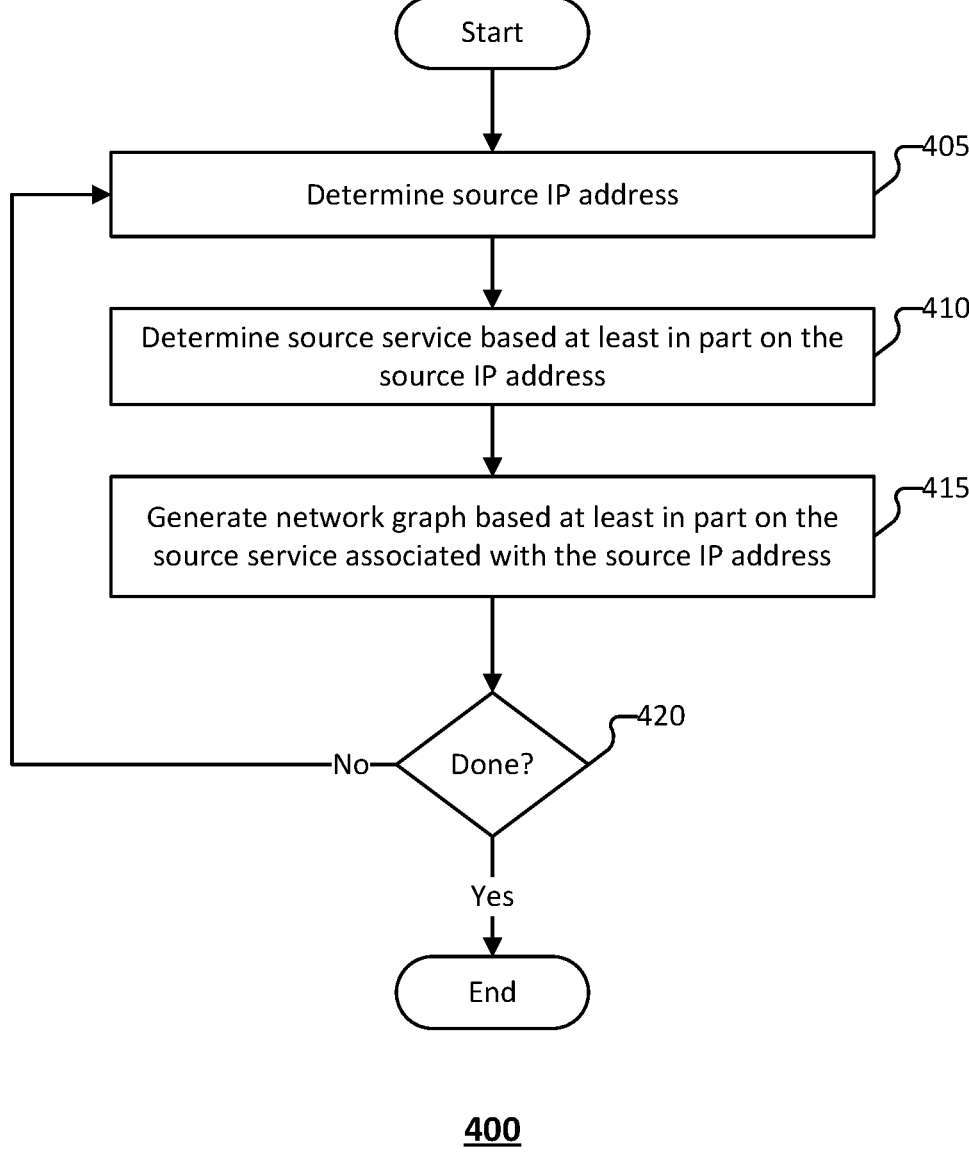
FIG. 4 is a flow diagram of a method for performing discovery of service to service communication traffic according to various embodiments.

FIG. 4 is a flow diagram of a method for performing discovery of service plane traffic according to various embodiments. In some embodiments, process 400 is implemented at least in part by system 100 of FIG. 1, system 200 of FIG. 2, and/or system 300 of FIG. 3.

At 405, a source IP address is determined. In some embodiments, the system determines the source IP address by querying a DNS service. For example, the system obtains a record from a DNS log (e.g., a snapshot of the DNS log) for a service plane and obtains an indication of the requested service and a source IP address for the service making a call to the requested service. The system may obtain a snapshot of the DNS log maintained by the DNS service from, or query the DNS service for, a record in the DNS log or otherwise an indication of a requested service and a source IP address for the service making the call to the requested service. The DNS service may be within the service plane of an application service and may provide the snapshot of the DNS log, or the information for a record in the DNS log, to a security service deployed outside the service plane.

At 410, a source service is determined based at least in part on the source IP address. In some embodiments, the system determines the source service based at least in part on information obtained from a service registry. The application service associated with the service plane may maintain a service registry that associates services within the service plane with corresponding IP addresses. The system (e.g., a security service) may query the service registry in connection with performing a reverse lookup of the source service based on the source IP address. For example, in response to determining the source IP address at 405, the system provides the service registry with the source IP address and requests the source service (e.g., an identifier associated with the source service, such as a source service name).

At 415, a network graph is generated (or updated) based at least in part on the source service associated with the source IP address. In some embodiments, in response to determining the source service, the system generates or updates a network graph for the service plane to include an association between the source service and the requested service. For example, the system uses the DNS log record and the service registry to infer a connection between the requested service for the DNS record and the service in the service plane that had made a call to the requested service.

At 420, a determination is made as to whether process 400 is complete. In some embodiments, process 400 is determined to be complete in response to a determination that no further network graphs are to be determined, no further DNS logs are to be analyzed, the network graph for a network has been generated, an administrator indicates that process 400 is to be paused or stopped, etc. In response to a determination that process 400 is complete, process 400 ends. In response to a determination that process 400 is not complete, process 400 returns to 405.

According to various embodiments, process 400 may iterate over 405-420 until all records in a particular DNS log (e.g., a snapshot of a DNS log) have been analyzed to trace the source service that made the call to the requesting service for the record. After processing the records within the DNS log, the system has a network graph that comprises the various connections or dependencies across services in an application service. Alternatively, at 405, 410, and 415 may be performed in parallel or in combination for the various records in the DNS log. For example, the system may perform batch lookups against the DNS log and the service registries to determine the associations between services (e.g., between source services and requested services).

Figure 5:
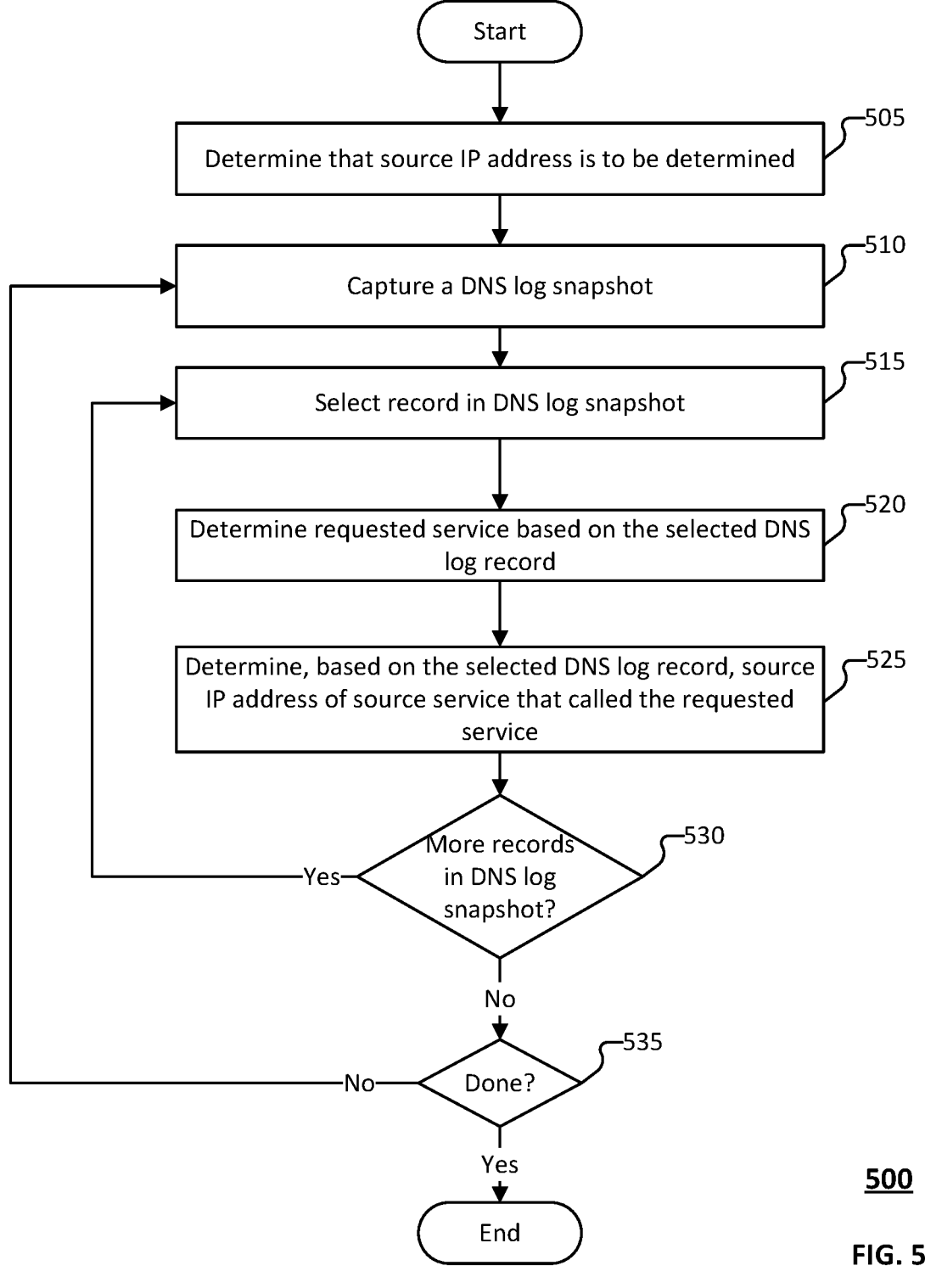
FIG. 5 is a flow diagram of a method for determining a source Internet Protocol (IP) address associated with a service call according to various embodiments.

FIG. 5 is a flow diagram of a method for determining a source Internet Protocol (IP) address associated with a service call according to various embodiments. In some embodiments, process 500 is implemented at least in part by system 100 of FIG. 1, system 200 of FIG. 2, and/or system 300 of FIG. 3. In some embodiments, process 500 is invoked in connection with process 400 of FIG. 4. For example, process 500 is invoked by 405 of process 400.

At 505, the system determines that a source IP address is to be determined. In some embodiments, the system determines to perform a determination of the source IP address in connection with determining (e.g., generating/updating) a network graph. For example, in response to determining to generate the network graph, the system determines that one or more source IP address(es) corresponding to services calling one or more requested services are to be determined.

At 510, a snapshot of the DNS log is captured. In response to determining that a source IP address is to be determined (e.g., that a network graph of a service plane is to be generated or updated), the system captures a snapshot of the DNS log (or causes a snapshot of the DNS log to be captured, such as by a DNS service within the service plane). The system may query the DNS service against a snapshot of the DNS log maintained at the DNS service, or the system may obtain from the DNS service, the snapshot of the DNS log against which the system runs queries for determining associations between requested services and corresponding source services.

At 515, a record in the snapshot of the DNS log snapshot is selected. For example, process 500 iterates over the records in the DNS log snapshot (e.g., over all records in the DNS log snapshot) in connection with tracing the dependencies or connections within a service plane. The system selects a record in the snapshot of the DNS log that has not yet been analyzed in connection with generating or updating the network graph (e.g., a record that has not been analyzed for the iterations over 515-530).

At 520, a requested service is determined based at least in part on the selected DNS log record.

At 525, the source IP address of the source service that called the requested service is determined based at least in part on the DNS log record. For example, for a record in the DNS log record, the system determines a requested service and a source IP address corresponding to the record.

In some embodiments, 520 and 525 are performed in combination/parallel. For example, in response to selecting the record, the system determines the requested service and corresponding source IP for the record.

At 530, the system determines whether more records in the DNS log snapshot are to be analyzed. For example, the system determines whether an association between a requested service and a source IP address is to be established for any further records in the DNS log snapshot. In response to determining that one or more records in the DNS log snapshot are to be analyzed, the system returns to 515 and process 500 iterates over 515-530 until no further records in the DNS log snapshot have been analyzed (e.g., the system has analyzed all records in the DNS log snapshot).

At 535, a determination is made as to whether process 500 is complete. In some embodiments, process 500 is determined to be complete in response to a determination that no further source IP addresses are to be identified based on DNS log snapshots, no further records in the snapshot of the DNS log are to be analyzed, an administrator indicates that process 500 is to be paused or stopped, etc. In response to a determination that process 500 is complete, process 500 ends. In response to a determination that process 500 is not complete, process 500 returns to 505.

In some embodiments process 500 iterates over 505-535 according to a predefined time period (e.g., a predefined periodicity). For example, process 500 iterates over 505-535 in connection with maintaining an updated network graph or catalog of dependencies/connections among services in the service plane.

Figure 6:
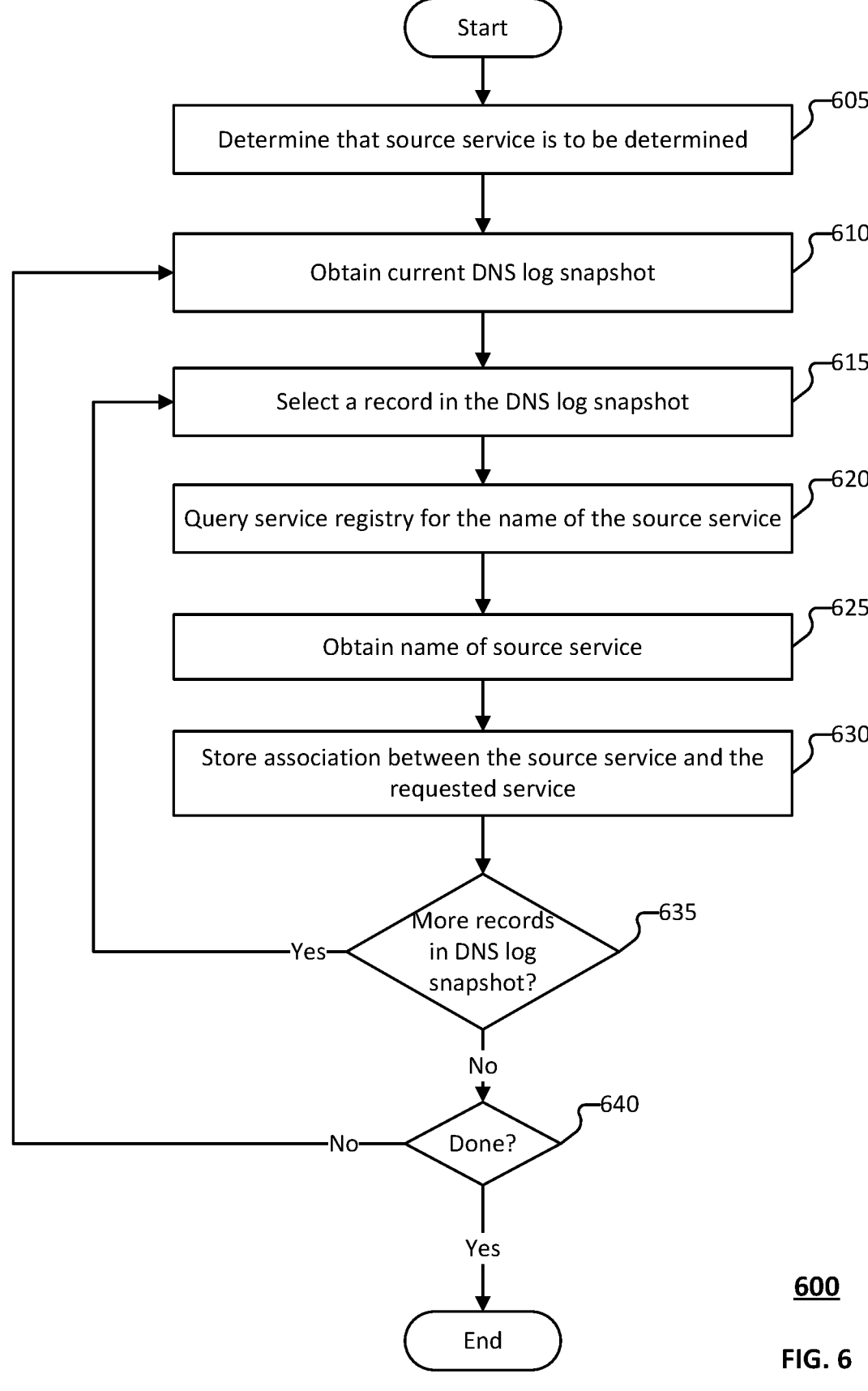
FIG. 6 is a flow diagram of a method for determining a source service associated with a service call according to various embodiments.

FIG. 6 is a flow diagram of a method for determining a source service associated with a service call according to various embodiments. In some embodiments, process 600 is implemented at least in part by system 100 of FIG. 1, system 200 of FIG. 2, and/or system 300 of FIG. 3. In some embodiments, process 600 is invoked in connection with process 400 of FIG. 4. For example, process 600 is invoked by 410 of process 400.

At 605, the system determines that a source service is to be determined. In some embodiments, the system determines to perform a determination of the source service in connection with determining (e.g., generating/updating) a network graph. For example, in response to determining to generate or update the network graph, the system determines that one or more source services are to be determined/identified. The system may determine that a determination of the source service is to be performed in response to invocation of process 600 (e.g., based on the request to implement process 600).

At 610, a current DNS log snapshot is obtained.

At 615 a record in the current DNS log snapshot is selected.

At 620, the service registry is queried for the name of the source service corresponding to the selected record. For example, the system queries the service registry based at least in part on the source IP address that the system obtained from the selected record.

At 625, an identifier for the source service is obtained. In some embodiments, the system obtains a response from the query of the service registry. The identifier for the source service may be a name of the corresponding service. As an example, the identifier is a universally unique identifier (UUID) within the service plane.

At 630, an association between the source service and the requested service is stored. In response to the system determining, for a record in the current DNS log snapshot, a requested service and a corresponding source service (e.g., the source service associated with the source IP address comprised in the DNS record), the system stores the association, such as in a mapping of dependencies or connections between services in the service plane.

At 635, the system determines whether more records in the DNS log snapshot are to be analyzed. For example, the system determines whether an association between a source service and a source IP address is to be established for any further records in the DNS log snapshot (e.g., whether an association between a source service and a requested service is to be stored). In response to determining that one or more records in the DNS log snapshot are to be analyzed, the system returns to 615 and process 600 iterates over 616-630 until no further records in the DNS log snapshot have been analyzed (e.g., the system has analyzed all records in the DNS log snapshot).

At 640, a determination is made as to whether process 600 is complete. In some embodiments, process 600 is determined to be complete in response to a determination that no further source services are to be identified based on DNS log snapshots, no further records in the snapshot of the DNS log are to be analyzed, an administrator indicates that process 600 is to be paused or stopped, etc. In response to a determination that process 600 is complete, process 600 ends. In response to a determination that process 600 is not complete, process 600 returns to 605.

In some embodiments process 600 iterates over 605-635 according to a predefined time period (e.g., a predefined periodicity). For example, process 600 iterates over 605-635 in connection with maintaining an updated network graph or catalog of dependencies/connections among services in the service plane.

Figure 7:
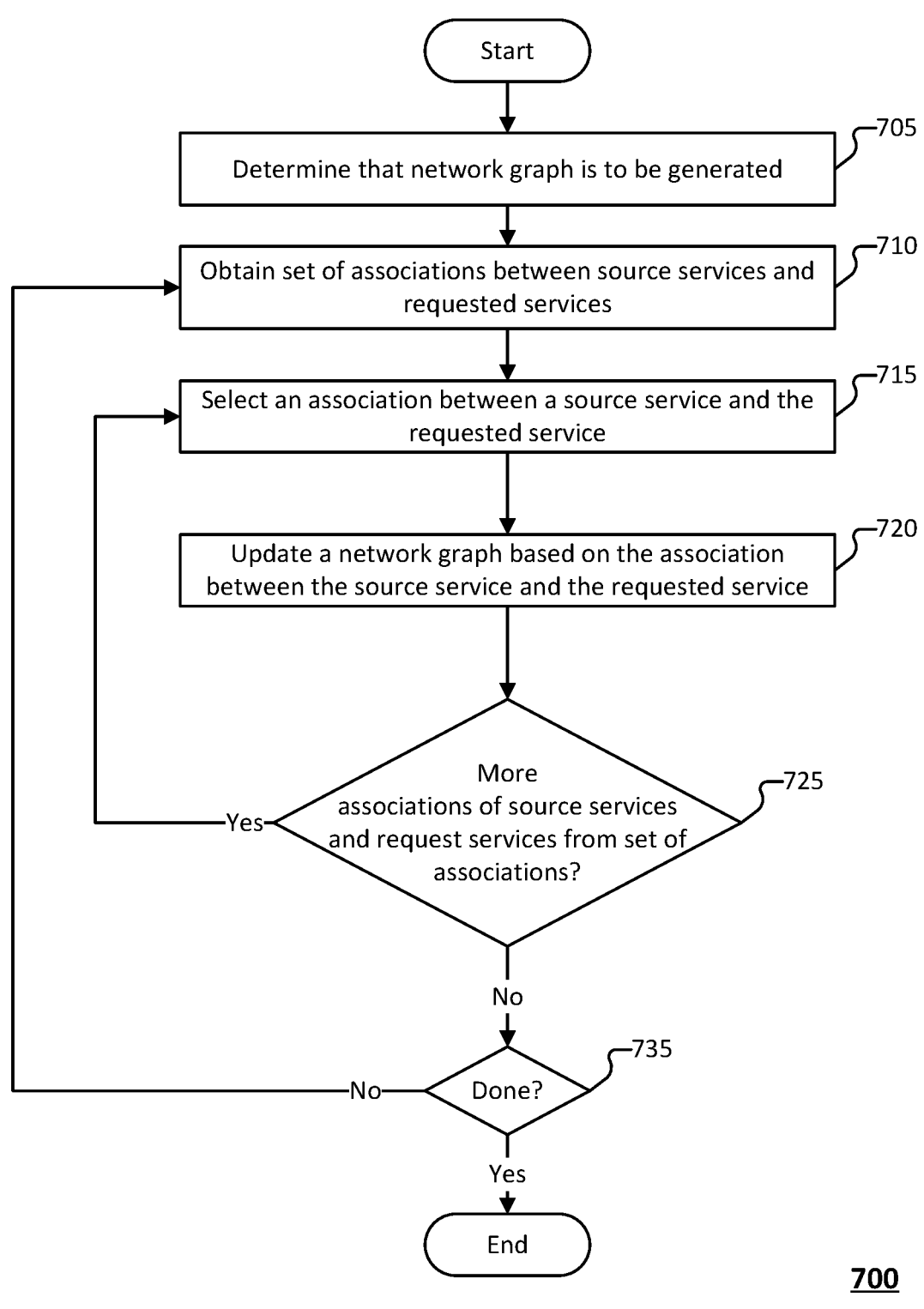
FIG. 7 is a flow diagram of a method for generating a network graph according to various embodiments.

FIG. 7 is a flow diagram of a method for generating a network graph according to various embodiments. In some embodiments, process 700 is implemented at least in part by system 100 of FIG. 1, system 200 of FIG. 2, and/or system 300 of FIG. 3. In some embodiments, process 700 is invoked in connection with process 400 of FIG. 4. For example, process 700 is invoked by 415 of process 400.

At 705, the system determines that a network graph is to be generated. As an example, the generating the network graph may comprise generating a new network graph or updating an existing network graph, such as to reflect changes in dependencies/connections among services or changes caused by the removal or addition of new services from/to the service plane. At 710, a set of associations between source services and requested services is obtained. In some embodiments, the system obtains the set of associations between the source services and the requested services based at least in part on obtaining a mapping of dependencies or connections between services in the service plane that is generated/stored at 630 of process 600. At 715, an association between the source service and the requested service is selected. At 720, a network graph is updated based on the association between the source service and the requested service. At 735, a determination is made as to whether process 700 is complete. In some embodiments, process 700 is determined to be complete in response to a determination that no further network traces between services in a service plane are to be included in the network graph, generating or updating the network graph is complete, an administrator indicates that process 700 is to be paused or stopped, etc. In response to a determination that process 700 is complete, process 700 ends. In response to a determination that process 700 is not complete, process 700 returns to 705.

In some embodiments process 700 iterates over 705-735 according to a predefined time period (e.g., a predefined periodicity). For example, process 700 iterates over 705-735 in connection with maintaining an updated network graph or catalog of dependencies/connections among services in the service plane.

In some embodiments, the system evaluates the network graph to determine whether the dependencies or connections violate a security policy or another configuration setting. Examples of other configuration settings may include (i) a policy that a service is not to depend on a service that no longer exists in the service plane, (ii) a policy that a service shall not have a connection to a non-existing service, (iii) a policy that a particular service is to have a dependency or connection to another service, (iv) a policy that a connection between two particular services is the shortest possible connection (e.g., the services are directly connected where possible, such as where the service plane does not have another intervening dependency).

Figure 8:
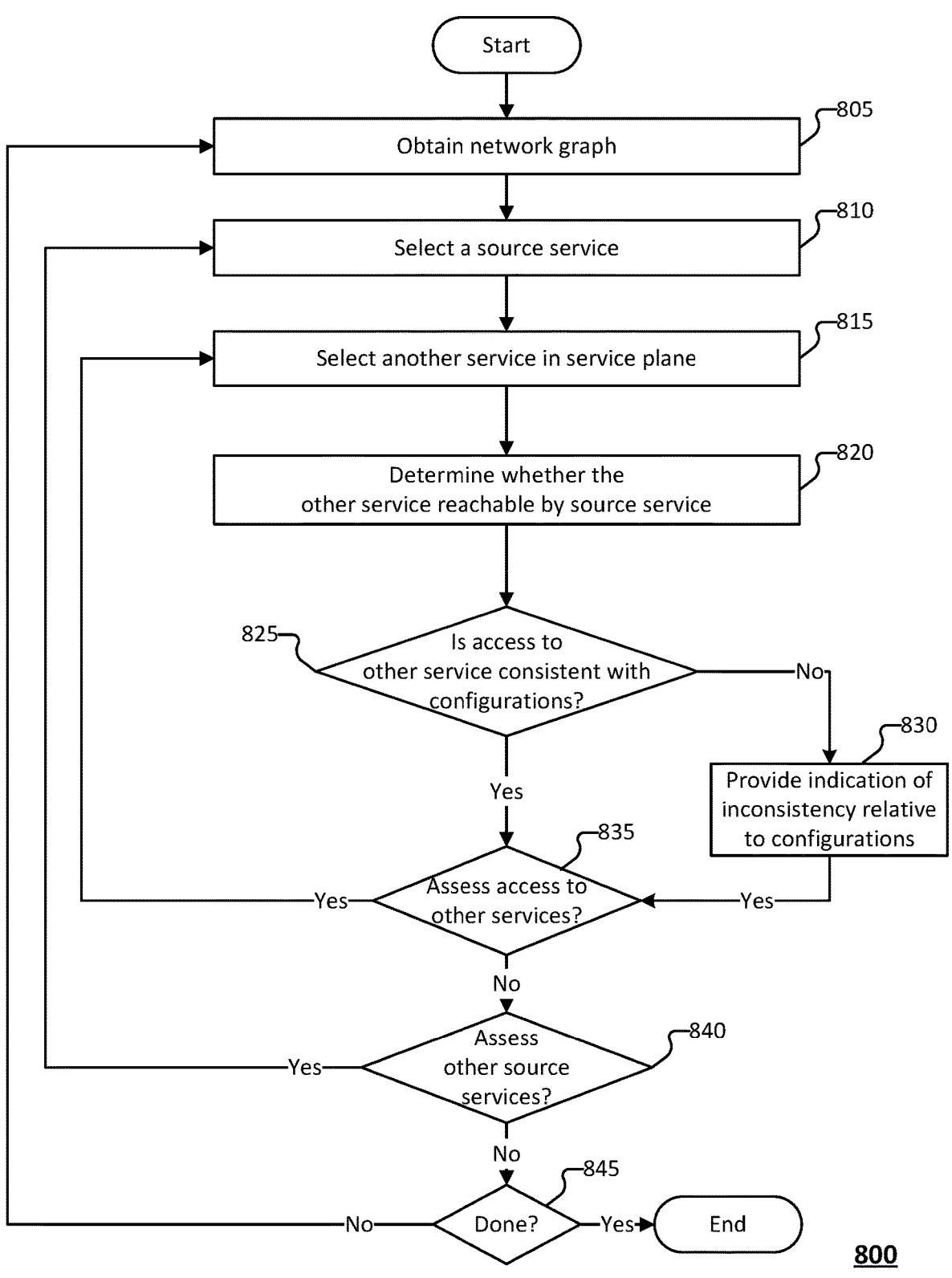
FIG. 8 is a flow diagram of a method for detecting vulnerabilities in a network based on a network graph according to various embodiments.

FIG. 8 is a flow diagram of a method for detecting vulnerabilities in a network based on a network graph according to various embodiments. In some embodiments, process 800 is implemented at least in part by system 100 of FIG. 1, system 200 of FIG. 2, and/or system 300 of FIG. 3.

At 805, a network graph is obtained. For example, the system obtains the network graph determined (e.g., generated, updated, etc.) at 720 of process 700.

At 810, a source service is selected. At 815, another service in the service plane is selected. In connection with evaluating the service plane (e.g., analyzing dependencies or connections among the various services in the service plane), the system selects a set of services (e.g., two services) for which the dependency or connection therebetween is to be evaluated.

At 820, the system determines whether the selected other service is reachable by the selected source service. For example, the system determines whether the selected source service and the other selected service are connected directly or via one or more other services.

At 825, the system determines whether the access to the selected other service is consistent with the configurations of the application service. For example, the system determines whether the presence or absence of a dependency or connection between the selected source service and the selected service is consistent with the configurations of the application service, such as a security policy, or a policy for valid connections or dependencies (e.g., no dependencies/connections to non-existing services, efficient dependencies/connections between the services, etc.).

In response to determining that the access to the selected other service is inconsistent with the configurations at 825, process 800 proceeds to 830 at which an indication of the inconsistency relative to configurations (e.g., predefined configurations such as a security policy) is provided. For example, the system provides an indication (e.g., to an administrator) that a particular service is accessible via a source service in contravention to a security policy (e.g., without a proper authentication being performed, or for which the source service does not have permissions, etc.). Thereafter, process 800 proceeds to 835. Conversely, in response to determining that the access to the other service is consistent with the configurations at 825, process 800 proceeds to 835.

At 835, the system determines whether to assess access to other services. For example, the system determines another service for which the system analyzes dependencies and connections with the other services in the service plane. In response to determining to assess access to another service, process 800 returns to 815 and process 800 iterates over 815-835 until access for no further other services is to be assessed. Conversely, in response to determining that access for no further other services is to be assessed at 835, process 800 proceeds to 840.

At 840, the system determines whether to assess the network graph for another source service. For example, the system determines whether to evaluate the dependencies or connections associated with a source service. As another example, the system determines whether to evaluate potential requested services that may be accessed by a particular source service. In response to determining that the network graph is to be assessed for another source service at 840, process 800 returns to 810 and process 800 iterates over 810-840 until the system determines that no further assessments of the network graph are to be performed. Conversely, in response to determining that the network graph is not to be assessed for another service at 840, process 840 proceeds to 845.

At 845, a determination is made as to whether process 800 is complete. In some embodiments, process 800 is determined to be complete in response to a determination that no further network traces between services in a service plane are to be determined, analysis of the network graph has completed, an administrator indicates that process 800 is to be paused or stopped, etc. In response to a determination that process 800 is complete, process 800 ends. In response to a determination that process 800 is not complete, process 800 returns to 805.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for performing an agentless discovery of service to service communication traffic, comprising:
   one or more processors configured to:
      determine, based at least in part on one or more Domain Name System (DNS) logs, a source Internet Protocol (IP) address based on a resolved record for a requested service;
      determine a source service based at least in part on performing a lookup in a service registry based at least in part on the source IP address;
      generate, based at least in part on the source service associated with the source IP, a network graph for a service plane associated with an application service comprising the source service and the requested service, wherein the network graph comprises a plurality of edges mapping dependencies between services implemented in connection with the application service, and a particular edge in the plurality of edges comprises an indication of a type of dependency between the source service represented by a first vertex and a requested service represented by a second vertex, wherein the indication of type of dependency comprises information pertaining to one or more of a protocol and a function;
      detect, based at least in part on the network graph, a vulnerability associated with the service plane, wherein:
         the vulnerability is determined based at least in part on identifying violations of declared service access policies or authentication requirements between services; and
         the declared service access policies comprises one more of (i) a first policy that a particular service is not to depend on another service that no longer exists in the service plane, (ii) a second policy that the particular service shall not have a connection to a non-existing service, (iii) a third policy that the particular service is to have a dependency or connection to another service, (iv) a fourth policy that a connection between the particular service and another particular service is the shortest possible connection; and
      in response to detecting the vulnerability, generate an alert for a detected vulnerability in the network; and
   a memory coupled to the one or more processors and configured to provide the one or more processors with instructions.

2. The system of claim 1, wherein the one or more processors are further configured to:
   obtain the one or more DNS logs for periodic analysis.

3. The system of claim 1, wherein the network graph comprises a graph for a cloud-based application service.

4. The system of claim 1, wherein the network graph is generated in connection with facilitating detection of potential application service vulnerabilities.

5. The system of claim 1, wherein the one or more processors are further configured to:
   generate a call graph for the application service for a graph of network connections in a network based on extracted DNS information.

6. The system of claim 5, wherein the vulnerability associated with the service plane is detected in connection with performing a verification of a service authentication integrity based on the call graph to identify a potentially vulnerable service point in the network.

7. The system of claim 6, wherein:

the vulnerability comprises a potentially vulnerable service point in the network; and the alert is generated for the detected vulnerability in a service point in the network in response to identifying a potentially vulnerable service point in the network.

8. The system of claim 1, wherein the network graph is generated without use of a discovery agent that identifies calls between at least two application services.

9. The system of claim 1, wherein the network graph is generated without use of a sidecar that serves as a proxy and captures input data and output data.

10. The system of claim 1, wherein the network graph is generated without using a network packet sniffer.

11. The system of claim 1, wherein the one or more processors are further configured to:

capture a snapshot of the DNS log at a predefined time interval.

12. The system of claim 11, wherein the predefined time interval is every 30 seconds.

13. The system of claim 11, wherein the network graph is generated based on a particular snapshot of the DNS log.

14. The system of claim 11, wherein for each snapshot of the DNS log, a version of the network graph is generated.

15. The system of claim 1, wherein the one or more processors are further configured to:

determine, based at least in part on the network graph, whether an endpoint has access to a second service in the application service via a first service; and permissions for the endpoint do not include access to the second service.

16. The system of claim 1, wherein the one or more processors are further configured to:

detect whether a first service in the application service is accessible by an endpoint via one or more other services in the application service without authentication of the endpoint for the first service.

17. The system of claim 1, wherein the network graph is generated without the use of discovery agents, sidecars, or packet sniffers, and is instead derived exclusively from DNS logs and service registry lookups in a cloud-native environment.

18. The system of claim 1, wherein the one or more processors are further configured to capture successive snapshots of the DNS logs at predefined time intervals, and generate a corresponding version of the network graph for each snapshot.

19. The system of claim 18, wherein the one or more processors are further configured to compare at least two temporally versioned network graphs to identify changes in service-to-service dependencies and detect vulnerabilities introduced by such changes.

20. The system of claim 1, wherein each edge in the network graph further comprises metadata identifying an API call type, request/response pattern, or service role dependency associated with the communication.

21. A method for performing agentless discovery of service to service communication traffic, comprising:

determining, based at least in part on one or more Domain Name System (DNS) logs, a source Internet Protocol (IP) address based on a resolved record for a requested service;

determining a source service based at least in part on performing a lookup in a service registry based at least in part on the source IP address;

generating, based at least in part on the source service associated with the source IP, a network graph for a service plane associated with an application service comprising the source service and the requested service, wherein the network graph comprises a plurality of edges mapping dependencies between services implemented in connection with the application service, and a particular edge in the plurality of edges comprises an indication of a type of dependency between the source service represented by a first vertex and a requested service represented by a second vertex, wherein the indication of type of dependency comprises information pertaining to one or more of a protocol and a function; and detecting, based at least in part on the network graph, a vulnerability associated with the service plane, wherein:

the vulnerability is determined based at least in part on identifying violations of declared service access policies or authentication requirements between services; and the declared service access policies comprises one more of (i) a first policy that a particular service is not to depend on another service that no longer exists in the service plane, (ii) a second policy that the particular service shall not have a connection to a non-existing service, (iii) a third policy that the particular service is to have a dependency or connection to another service, (iv) a fourth policy that a connection between the particular service and another particular service is the shortest possible connection; and in response to detecting the vulnerability, generating an alert for a detected vulnerability in the network.

22. A computer program product embodied in a non-transitory computer readable medium for performing agentless discovery of service to service communication traffic, and the computer program product comprising computer instructions for:

determining, based at least in part on one or more Domain Name System (DNS) logs, a source Internet Protocol (IP) address based on a resolved record for a requested service;

determining a source service based at least in part on performing a lookup in a service registry based at least in part on the source IP address;

generating, based at least in part on the source service associated with the source IP, a network graph for a service plane associated with an application service comprising the source service and the requested service, wherein the network graph comprises a plurality of edges mapping dependencies between services implemented in connection with the application service, and a particular edge in the plurality of edges comprises an indication of a type of dependency between the source service represented by a first vertex and a requested service represented by a second vertex, wherein the indication of type of dependency comprises information pertaining to one or more of a protocol and a function;

detecting, based at least in part on the network graph, a vulnerability associated with the service plane, wherein:

the vulnerability is determined based at least in part on identifying violations of declared service access policies or authentication requirements between services; and the declared service access policies comprises one more of (i) a first policy that a particular service is not to depend on another service that no longer exists in the service plane, (ii) a second policy that the particular service shall not have a connection to a non-existing service, (iii) a third policy that the particular service is to have a dependency or connection to another service, (iv) a fourth policy that a connection between the particular service and another particular service is the shortest possible connection; and in response to detecting the vulnerability, generating an alert for a detected vulnerability in the network.

\* \* \* \* \*